United States Patent [19]
Nakajima et al.

[11] Patent Number: 6,155,596
[45] Date of Patent: *Dec. 5, 2000

[54] HEAD-PROTECTING AIR BAG APPARATUS

[75] Inventors: Hiroki Nakajima, Nagoya; Choko Terazawa, Ichinomiya, both of Japan

[73] Assignees: Toyota Jidosha Kabushiki Kaisha, Toyota; Toyota Gosei Co., Ltd., Nishikasugai-gun, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/145,024

[22] Filed: Sep. 1, 1998

[30] Foreign Application Priority Data

Sep. 4, 1997 [JP] Japan ................................. 9-239808

[51] Int. Cl.[7] .................................................. B60R 21/22
[52] U.S. Cl. ..................................... 280/730.2; 280/743.1
[58] Field of Search ............................. 280/730.1, 730.2, 280/743.1

[56] References Cited

U.S. PATENT DOCUMENTS

| | | |
|---|---|---|
| 5,322,322 | 6/1994 | Bark et al. . |
| 5,462,308 | 10/1995 | Seki et al. . |
| 5,480,181 | 1/1996 | Bark et al. . |
| 5,540,459 | 7/1996 | Daniel . |
| 5,588,672 | 12/1996 | Karlow et al. . |
| 5,605,346 | 2/1997 | Cheung et al. . |
| 5,660,414 | 8/1997 | Karlow et al. . |
| 5,722,685 | 3/1998 | Eyrainer ............................... 280/730.2 |
| 5,791,683 | 8/1998 | Shibata et al. ....................... 280/730.2 |
| 5,884,937 | 3/1999 | Yamada ................................ 280/730.2 |

FOREIGN PATENT DOCUMENTS

| | | |
|---|---|---|
| 6-227340 | 8/1994 | Japan . |
| 9-207701 | 8/1997 | Japan . |
| 96/26087 | 8/1996 | WIPO . |

*Primary Examiner*—Eric Culbreth
*Attorney, Agent, or Firm*—Pillsbury Madison & Sutro LLP

[57] ABSTRACT

A head-protecting air bag apparatus includes an air bag which is adapted to be fixed to a vehicle body so that the air bag extends from a pillar along a roof side rail and one of a front end and a rear end of which is fixed to an inflator. The air bag includes, at an intermediate portion thereof, a plurality of first noninflatable portions which intersect a tension line connecting the front and rear ends when the air bag is expanded, extend in a substantially vertical direction, and are located at a roof side region corresponding to the roof side rail. The air bag also includes a guide portion. The guide portion has a portion corresponding to the pillar and an extended portion extending to a first noninflatable portion of the plurality of first noninflatable portions which is adjacent to the one end.

19 Claims, 8 Drawing Sheets

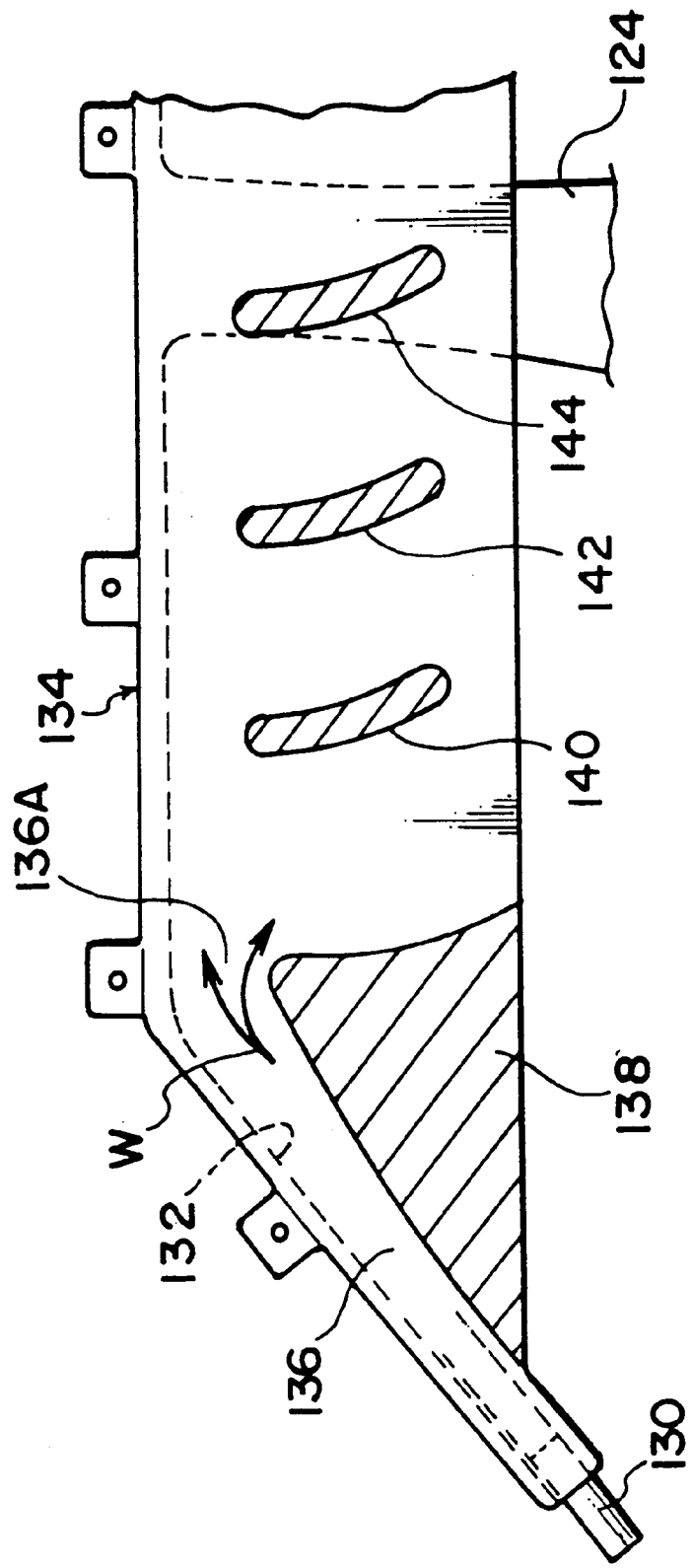

HEAD-PROTECTING AIR BAG APPARATUS

BACKGROUND OF THE INVENTION

1. Field of the Invention

The present invention relates to a head-protecting air bag apparatus which is adapted to eject a gas from an inflator when a predetermined heavy load is applied to a side of a vehicle body, so as to inflate by means of the gas an air bag stored in such a manner as to extend from a pillar section along a roof side rail.

2. Description of the Related Art

Conventionally, head-protecting air bag apparatuses have already been proposed in which, in order to improve performance of protecting the head of a vehicle occupant seated in a front seat when a predetermined heavy load is applied to a side of a vehicle body, an air bag folded and stored in such a manner as to extend from a front pillar section along a roof side rail is inflated along a side window glass. Hereafter, a description will be given of the arrangement shown in WO 96/26087 which discloses this type of head-protecting air bag apparatus.

As shown in FIG. 7, a head-protecting air bag apparatus 100 has as main components thereof: an elongated duct 106 disposed in such a manner as to extend from a front pillar section 102 along a roof side rail 104; an air bag 112 which is folded and stored in the duct 106 and fixed to a vehicle body at a front end fixing point 108 and a rear end fixing point 110; an inflator 116 which is connected to a rear end of the duct 106 through a hose 114 and is adapted to eject a gas when a predetermined heavy load is applied to the side of the vehicle body; and a belt-shaped strap 118 having one end fixed to the vehicle body and the other end fixed to a rear end portion of the air bag 112. Further, the air bag 112 is formed by connecting a plurality of cells 120 which are respectively formed in a substantially cylindrical shape and arranged such that longitudinal directions thereof are substantially parallel to the vertical direction of the vehicle.

In the above-described structure, when a predetermined heavy load is applied to the side of the vehicle body, the gas is ejected from the inflator 116. For this reason, the ejected gas flows into the cells 120 of the folded air bag 112 through the hose 114 and the duct 106. Consequently, the cells 120 are inflated to the substantially cylindrical shape and arranged such that the longitudinal directions thereof are substantially parallel to the vertical direction of the vehicle, and thereby the air bag 112 is expanded and suspended like a curtain along a window glass 122. Further, since the rear end portion of the air bag 112 is connected to the vehicle body by the strap 118, the rear side of the air bag 112 is surely disposed on an inner side of an upper portion of a center pillar section 124.

However, in the above-described head-protecting air bag apparatus, high gas pressure acts on a portion of the air bag 112 close to the inflator 116 due to the flowing gas from the inflator 116. For this reason, as shown in FIG. 8, in a case where an inflator 130 is provided on a front pillar section 132, and where a pillar guide portion 136 of an air bag 134 formed along the front pillar section 132 is contracted into a tubular shape by means of a joined portion 138 formed by sewing, bonding, or the like, a flow of the gas (arrow W in FIG. 8) during the early period of the expansion of the air bag changes suddenly in a vicinity of a rear end 136A of the guide portion 136, which forms an outlet of a tubular portion. In addition, since an upper fastened portion of an unillustrated front pillar garnish is located in a vicinity of the rear end 136A of the guide portion 136, the load applied to the upper fastened portion of the front pillar garnish increases due to the aforementioned change in gas pressure. Accordingly, in the head-protecting air bag apparatus such as the one shown in FIG. 8, it is necessary to reinforce the upper fastened portion of the front pillar garnish, and the like.

Moreover, in the head-protecting air bag apparatus such as the one shown in FIG. 8, during the early period of inflation of the air bag 134, the load increases at noninflatable portions 140, 142 and 144 located downstream of the rear end 136A of the pillar guide portion 136, particularly at the noninflatable portion 140 located in the vicinity of the rear end 136A of the guide portion 136.

SUMMARY OF THE INVENTION

In view of the above-described circumstances, it is an object of the present invention to provide a head-protecting air bag apparatus which makes it possible to reduce a load acting on an upper fastened portion of a pillar garnish or on noninflatable portions of an air bag during an early period of expansion of the air bag.

To this end, in accordance with the present invention, there is provided a head-protecting air bag apparatus comprising an air bag and an inflator which supplies gas to the air bag. The air bag includes a main body, attachable to a roof side rail of a vehicle body, having a peripheral edge. The main body includes a plurality of first noninflatable portions and a plurality of cylindrical inflatable portions disposed substantially parallel to each other. The air bag also includes a guide portion connected to the peripheral edge and integrally formed with the main body so as to allow gas from the inflator to be introduced into the main body. The guide portion includes an extended portion defined by a second non-inflatable portion disposed between the peripheral edge and an end of one of the plurality of first non-inflatable portions.

During the early period of the expansion of the air bag, gas supplied from the inflator passes through the guide portion and is introduced into the air bag, portions between the first noninflatable portions are inflated, and high tension is generated at the tension line. In the present invention, however, since the extended portion of the guide portion extends to the first noninflatable portion which is adjacent to the one end of the air bag fixed to the inflator, the flow of the gas to the inflatable portions is smooth, and the load upon the first noninflatable portions due to gas pressure can be reduced, and thus it is possible to improve an effect of reducing the breakage of the air bag. In addition, in a case where the guide portion is covered by the pillar garnish, since the guide portion has the extended portion arranged on the roof side, a portion at which gas flow changes drastically downstream of the guide portion is far from the upper fastened portion of the pillar garnish, and thus it is possible to reduce the load applied to the upper fastened portion of the pillar garnish.

BRIEF DESCRIPTION OF THE DRAWINGS

FIG. 8 is a schematic side view illustrating an air bag of a comparative head-protecting air bag apparatus which has been expanded completely.

DESCRIPTION OF THE PREFERRED EMBODIMENTS

Figure 1:
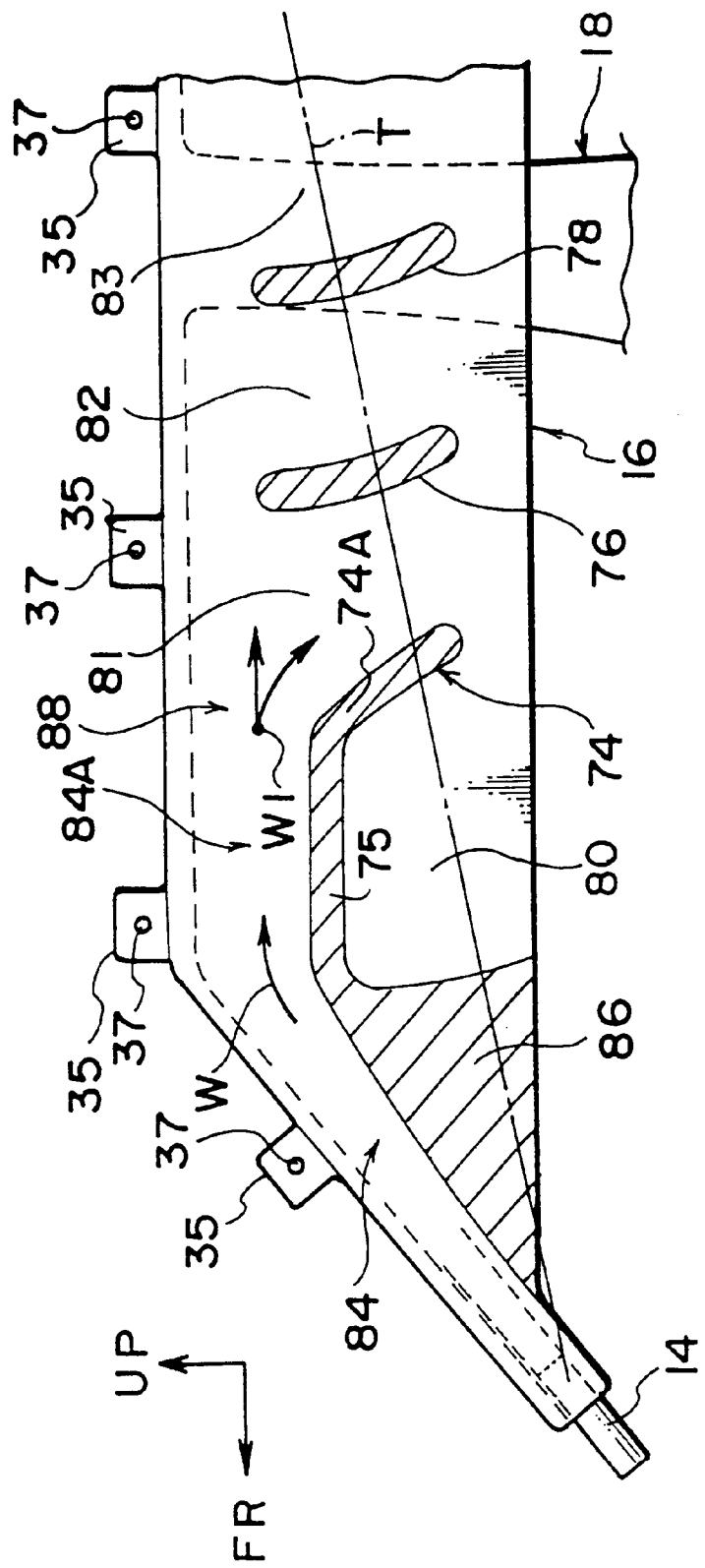
FIG. 1 is a side view, as viewed from the inner side of the vehicle, illustrating essential portions of an air bag of a head-protecting air bag apparatus in accordance with an embodiment of the present invention.

Referring now to FIGS. 1 to 6, a description will be given of an embodiment of a head-protecting air bag apparatus in accordance with the present invention.

It should be noted that in the drawings, arrow FR indicates the forward direction of the vehicle, arrow UP indicates the upward direction of the vehicle, and arrow IN indicates the transversely inward direction of the vehicle.

Figure 6:
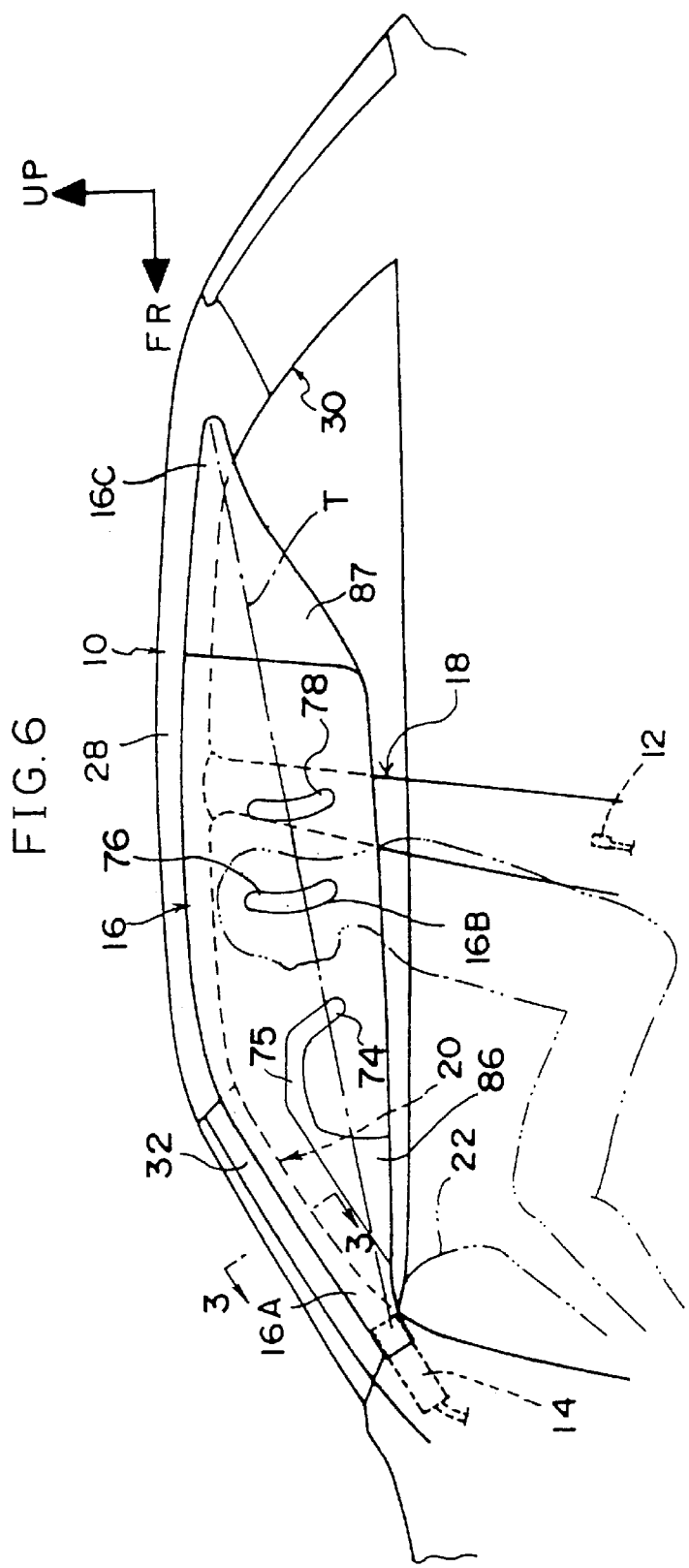
FIG. 6 is a schematic side view, as viewed from the inner side of the vehicle compartment, illustrating a state in which the air bag is inflated and hangs down like a curtain in the head-protecting air bag apparatus in accordance with the embodiment of the present invention.
Figure 7:
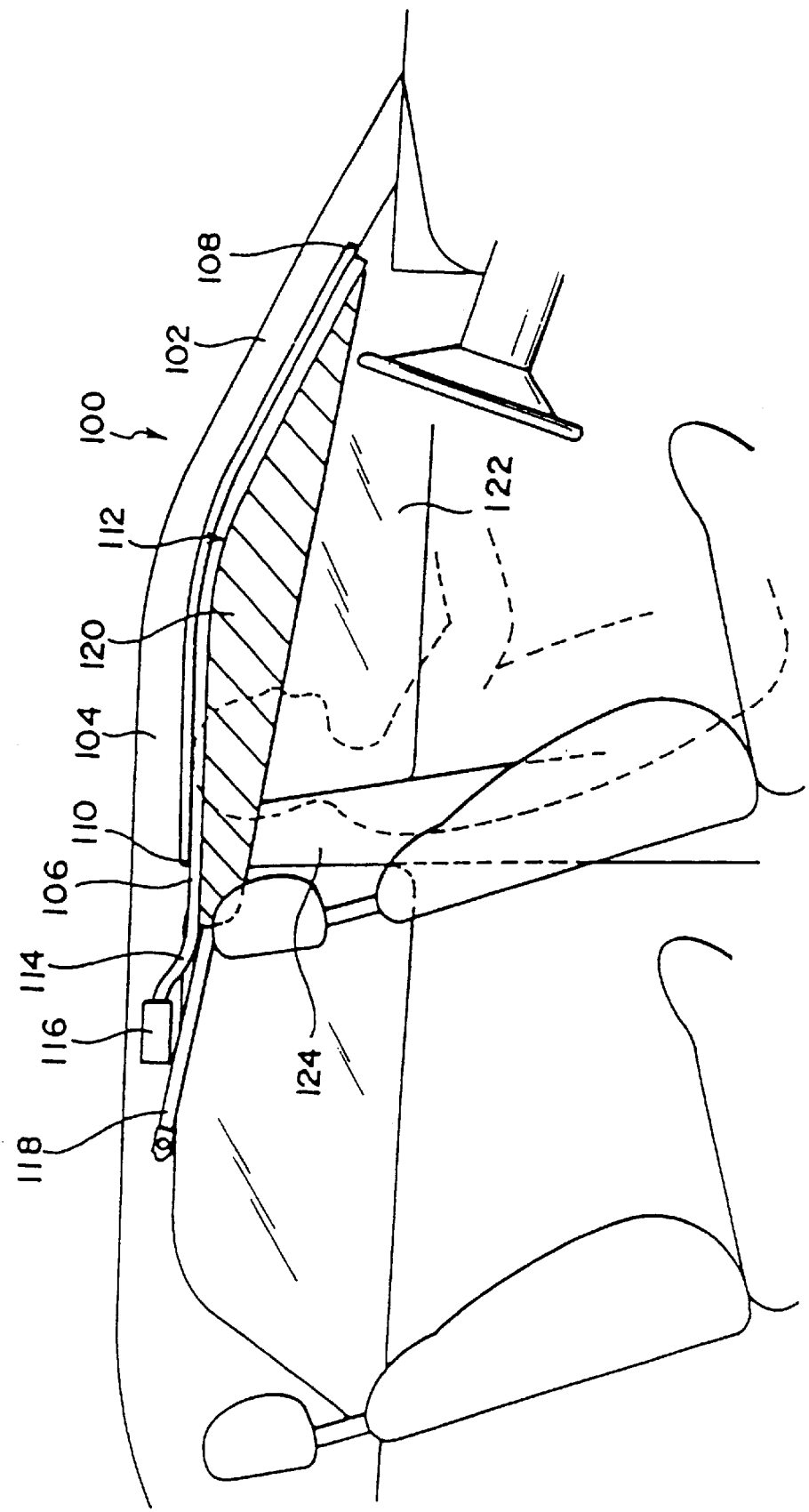
FIG. 7 is a schematic side view illustrating an air bag of a conventional head-protecting air bag apparatus which has been expanded completely.

As shown in FIG. 6, the head-protecting air bag apparatus 10 in this embodiment has as main components thereof: a sensor 12 for detecting the application of a predetermined heavy load to a side of a vehicle body; a columnar inflator 14 for ejecting a gas; and an air bag 16 which is folded in a predetermined folding manner.

The sensor 12 is disposed in a vicinity of a lower end of a center pillar section (B pillar section) 18, and detects the application of a heavy load of a predetermined value or greater to a side of the vehicle body.

The inflator 14 is disposed in a vicinity of a connecting portion between a front pillar section (A pillar section) 20 and an instrument panel 22, and is connected to the sensor 12 via a center control unit disposed below an unillustrated console box. Accordingly, when the sensor 12 detects the application of the predetermined heavy load to the side of the vehicle body, a predetermined current is supplied from the center control unit to the inflator 14, thereby actuating the inflator 14.

It should be noted that if the inflator 14 is disposed in the vicinity of the aforementioned connecting portion, there is an advantage in that a front end portion 16A of the air bag 16 can be directly connected to the inflator 14 as will be described later, but an arrangement may be adopted such that the inflator 14 is disposed at another portion of the vehicle body, and is connected to the front end portion 16A of the air bag 16 by means of a tube or the like. In addition, as the inflator 14, it is possible to adopt, among others, a gas-generating agent sealed in an interior which generates a gas when it burns, or an inflator which contains a high-pressure gas that is ejected when a partition wall provided therein is broken. Further, the air bag 16 is formed such that a shape of the air bag 16, as viewed from the side when inflated, is substantially of a parallelogram.

As shown in FIG. 1, rectangular attaching portions 35 project from upper edge portions of the air bag 16. Attaching holes 37 are formed in substantially central portions of the attaching portions 35, and the air bag 16 is secured to the vehicle body by means of bolts (not shown) inserted in the attaching holes 37.

As shown in FIG. 6, the air bag 16 is disposed in such a manner as to extend from the front pillar section 20 along a roof side rail section 28. More specifically, the front end portion 16A of the air bag 16 is located at a position where the inflator 14 is disposed, so as to allow the gas ejected from the inflator 14 to flow into the air bag 16. An intermediate portion 16B of the air bag 16 is arranged along the front pillar section 20 and the roof side rail section 28, and a rear end portion 16C of the air bag 16 is located in a vicinity of a quarter pillar section (C pillar section) 30.

Next, a description will be given of the structure of the front pillar section 20 and the air bag apparatus 10.

Figure 3:
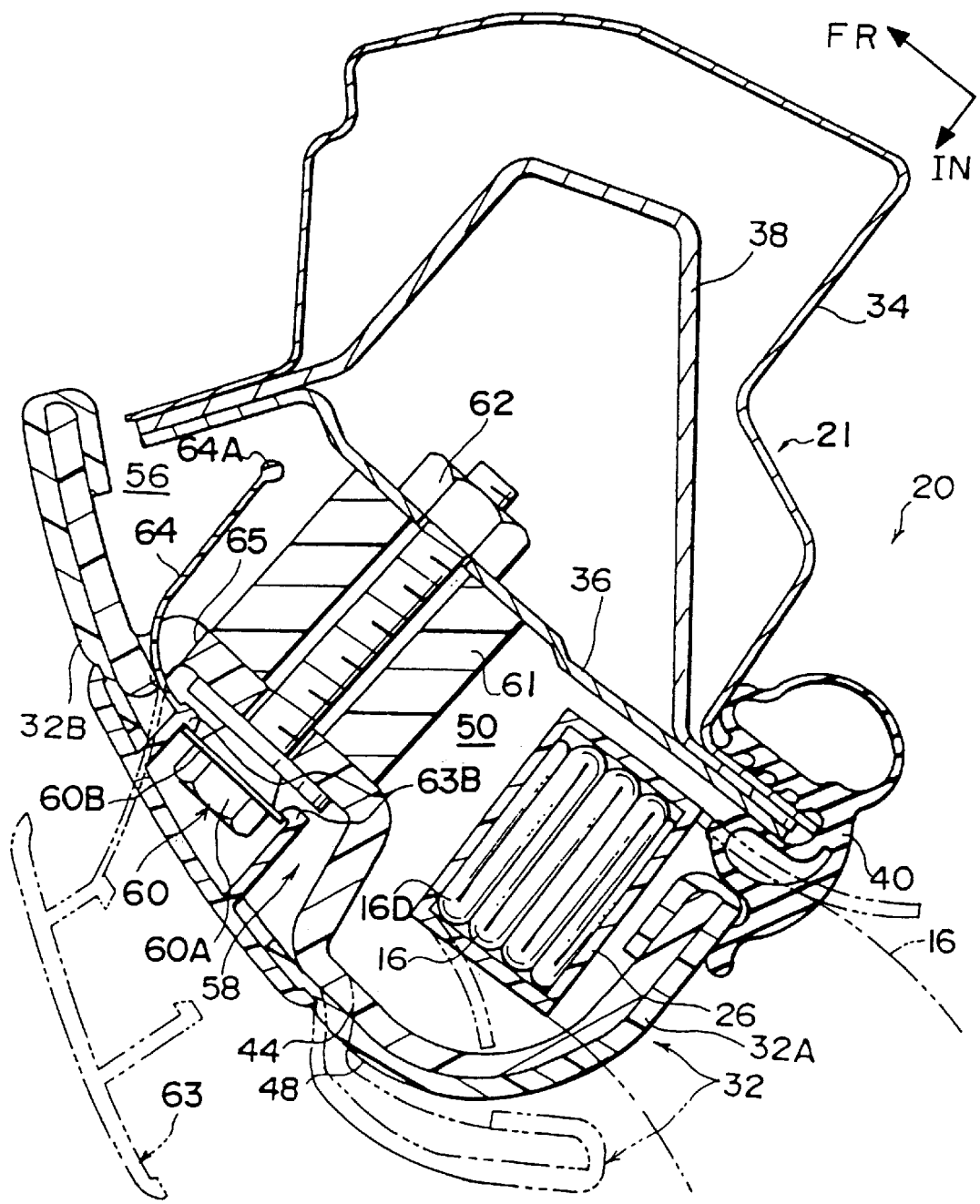
FIG. 3 is an enlarged cross-sectional view taken along line 3—3 of FIG. 6.

As shown in FIG. 3, the front pillar section 20 is comprised of a front pillar 21, which constitutes a main body portion thereof, and a pillar garnish 32 disposed in such a manner as to be set apart from a vehicle compartment side of the front pillar 21 and constituting an interior portion of the front pillar section 20.

The front pillar 21 has a closed cross section comprised of: a pillar outer panel 34 with a hat-shaped cross section disposed at the outer side of a vehicle compartment; a substantially flat plate-shaped pillar inner panel 36 disposed at the inner side of the vehicle compartment; and a pillar reinforcement 38 with a substantially hat-shaped cross section disposed therebetween. Incidentally, an opening weather strip 40 formed of an elastic body is fitted together with a rear-end flange portion of the front pillar 21.

The pillar garnish 32 is made of a resin or formed as a fiber laminate. The pillar garnish 32 is comprised of a base 44 formed of a non-breaking material such as TPO (Thermoplastic Olefin), i.e., a resin material which is elastically deformable and is difficult to break, and a surface layer 48 covering a surface of the base 44 (i.e., a surface of an inner side of the vehicle compartment). Incidentally, an end portion of the garnish 32 is engaged with the opening weather strip 40.

In addition, as indicated by a double-dashed chain line in FIG. 3, a rear portion 32A of the garnish 32, which shifts in the inward direction of the vehicle compartment when the air bag is expanded, is disposed at the inner side of the vehicle compartment with a predetermined interval with respect to the pillar inner panel 36, and thus a predetermined rear-side space 50 is formed between the garnish 32 and the pillar inner panel 36. A front portion 16D of the air bag 16 which is folded in a predetermined folding method so that a cross section thereof is rectangular is accommodated in this rear-side space 50 together with a case 26 which breaks open under a predetermined inflationary pressure. Attaching portions 35 of the air bag 16 are formed integrally at appropriate portions of the front portion 16D of the air bag 16 and case fixing portions are formed integrally at appropriate portions of the case 26, and the attaching portions 35 of the air bag 16 and case fixing portions are fixed together to the pillar inner panel 36.

A front portion 32B of the garnish 32 is disposed at the inner side of the vehicle compartment with a predetermined interval with respect to the pillar inner panel 36, and thus a predetermined front-side space 56 is formed between the front portion 32B of the garnish 32 and the pillar inner panel 36. This front-side space 56 is used as a space for installing a drain hose and a wire harness. Incidentally, a thickness of the rear portion 32A of the pillar garnish 32 may be thinner than that of the front portion 32B so as to allow the rear portion 32A of the pillar garnish 32 to open more easily.

Figure 4:
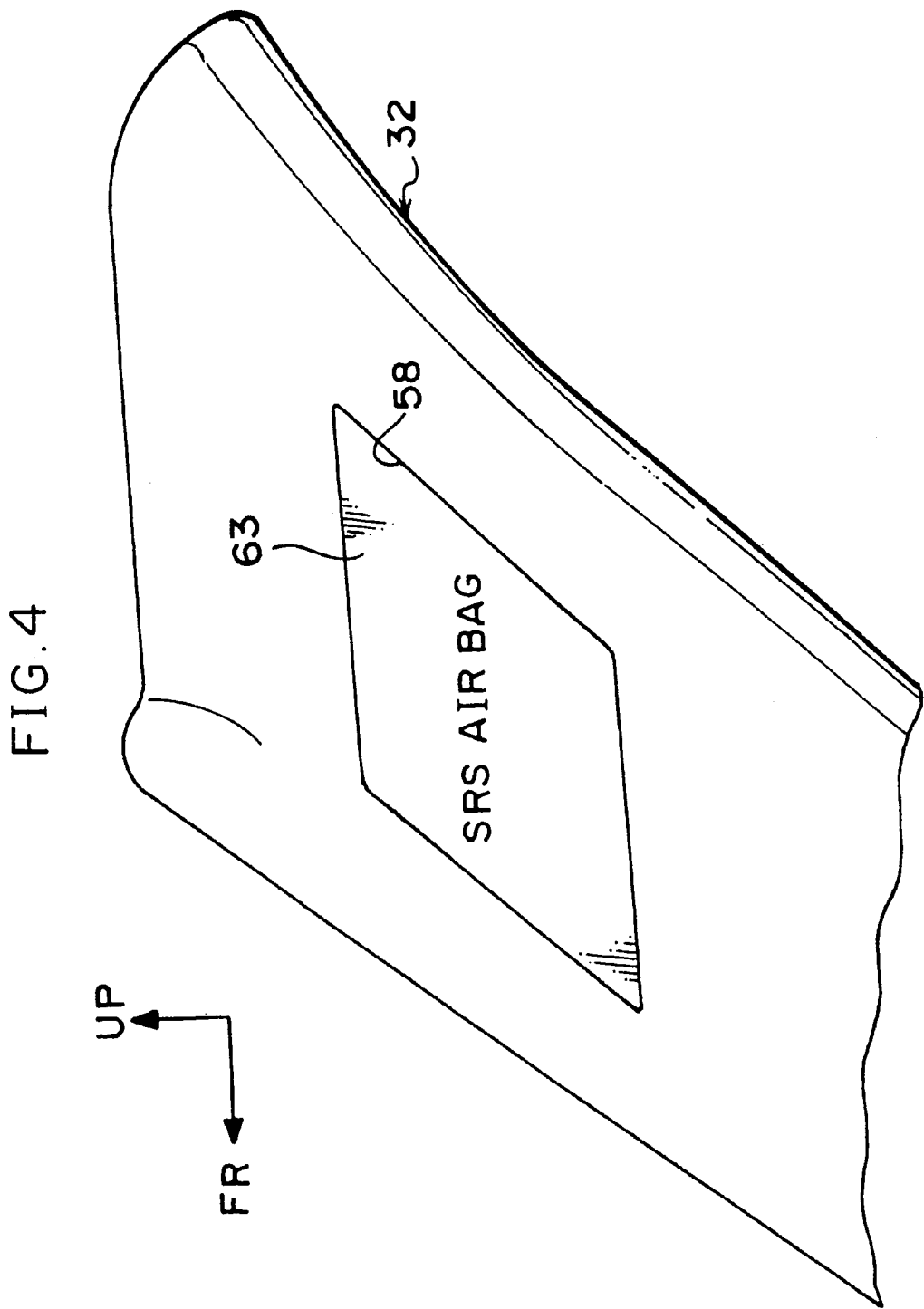
FIG. 4 is an enlarged side view illustrating an upper portion of a pillar garnish.

As shown in FIG. 4, a recessed portion 58 is formed on a design surface which is at an intermediate portion of the garnish 32 in the front direction, and a cap 63 is fitted in this recessed portion 58. A logo reading "SRS AIR BAG" or the like is inscribed on the design surface of the cap 63. In addition, the cap 63 and the recessed portion 58 are provided in a vicinity of an upper end of the garnish 32 and also in a vicinity of a lower end thereof (not shown).

As shown in FIG. 3, the recessed portion 58 of the garnish 32 is fixed to the pillar inner panel 36 with a resin-made hollow cylindrical spacer 61 interposed therebetween, by means of a fixing bolt 60 and a weld nut 62. Namely, the garnish 32, without clips or the like, is fixed directly to the pillar inner panel 36 by the bolts 60, and a head 60A of each bolt 60 is accommodated at the recessed portion 58. Further, a flange 60B is formed at the head 60A of the bolt 60, and engaging pawls 63B of the cap 63 are engaged with the flange 60B, thereby fixing the cap 63 to the pillar garnish 32.

Figure 5:
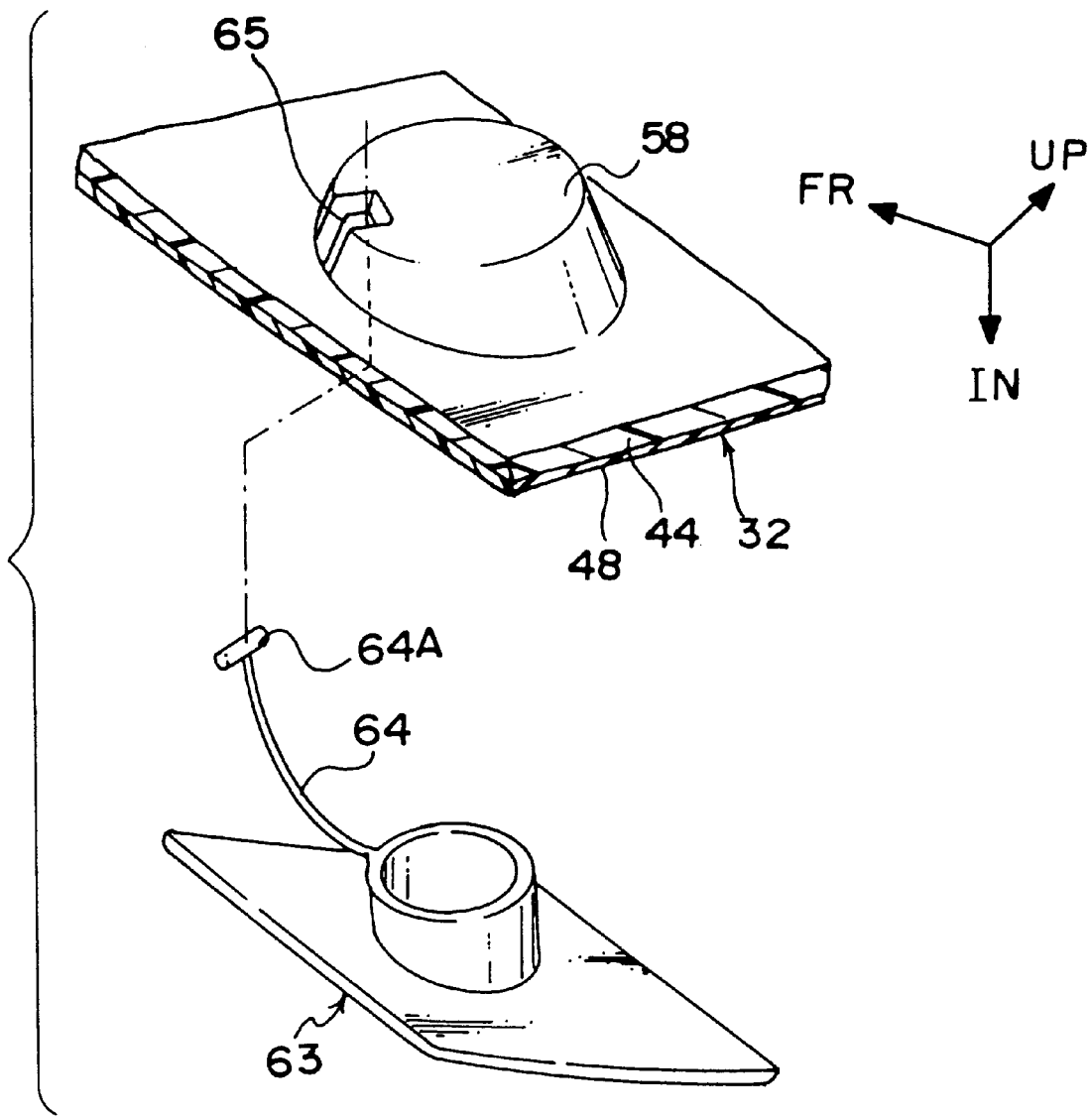
FIG. 5 is an enlarged perspective view illustrating a reverse surface of an upper portion of the pillar garnish.

As shown in FIG. 5, a connecting portion 64 connecting the cap 63 to the base 44 of the pillar garnish 32 is formed integrally at the reverse surface side of the cap 63. This connecting portion 64 is formed in a shape of a string, and a distal end is formed as a T-shaped engaging portion 64A.

As shown in FIG. 3, the connecting portion 64 is passed through a notch 65 formed in the recessed portion 58 of the garnish 32, and the engaging portion 64A is set to such a size as to engage with an outer peripheral portion of the notch 65. Namely, when the engaging portion 64A is passed through the notch 65, the connecting portion 64 needs to be elastically deformed to orient the engaging portion 64A toward the notch 65. However, when the cap 63 is disengaged from the recessed portion 58 (the case indicated by double-dashed chain lines in FIG. 3), the engaging portion 64A is engaged with the outer peripheral portion of the notch 65, and thus it is possible to prevent the cap 63 from falling off the garnish 32.

Next, a description will be given of the structure of the air bag which is an essential portion of this embodiment.

As shown in FIG. 1, first noninflatable portions 74, 76, and 78, which are made by sewing, bonding, or the like, and are formed in a vertically intermediate portion of the air bag 16 at predetermined intervals, such that the first noninflatable portions 74, 76, and 78 traverse a tension line T connecting a front end fixing point and a rear end fixing point of the air bag 16, and longitudinal directions of these first noninflatable portions 74, 76, and 78 correspond to the vertical direction of the air bag. A plurality of substantially parallel cylindrical inflatable portions 80, 81, 82, and 83, which traverse the tension line T during the expansion of the air bag, are formed by these noninflatable portions 74, 76, and 78.

To restrict an inflating region of the air bag 16 to a necessary extent and to make the inflator 14 compact, a guide portion 84 formed along the front pillar section 20 is contracted into a tubular shape by means of a joined portion (lower noninflatable portion) 86 formed by sewing, bonding, or the like, while an unillustrated rear portion is formed as a joined portion (noninflatable portion) 87 formed by sewing, bonding, or the like. The end (rear end) of the guide portion 84 of the air bag 16 is extended to the first noninflatable portion 74 located in a roof side region 88 adjacent to the guide portion 84 and is formed as an extended portion 84A, and the joined portion 86 is connected to an upper end portion 74A of the first noninflatable portion 74 via a second noninflatable portion 75. In addition, the extended portion 84A of the guide portion 84 is substantially parallel to a roof side rail section 28 (see FIG. 6) and continues to the upper end portion 74A of the first noninflatable portion 74, and the first noninflatable portion 74 is inclined in a direction toward the extended portion 84A of the guide portion 84 (diagonally forward). Incidentally, the first noninflatable portions 76 and 78 are formed in bow shapes which bulge in the forward direction. Since the first noninflatable portions are formed in the bow shapes, when the gas hits the first noninflatable portions, the gas is smoothly separated upward and downward and flows to portions remote from a guide portion, and thus pressure loss of the gas can be suppressed. In addition, inner side vehicle wall portions and outer side vehicle wall portions between the adjacent noninflatable portions are pulled in the vertical direction during the first inflation of the bag, and thus tension of the tension line can be increased.

Figure 2:
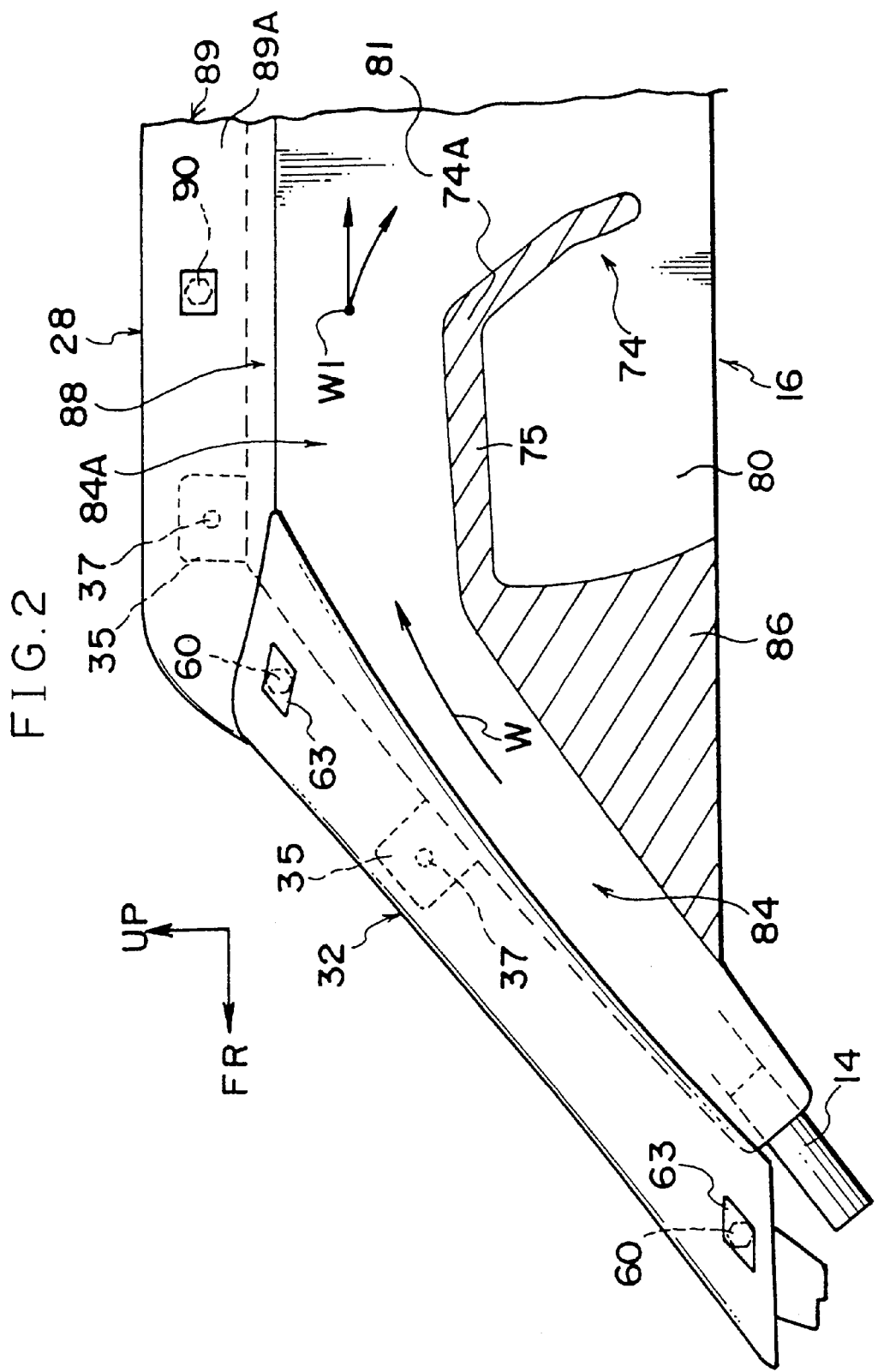
FIG. 2 is an enlarged side view, as viewed from the inner side of the vehicle, illustrating essential portions of the head-protecting air bag apparatus in accordance with the embodiment of the present invention.

As shown in FIG. 2, the pillar-garnish fixing bolt 60 provided at an upper fastened portion of the garnish 32 is located at an upper front portion of the extended portion 84A of the pillar guide portion 84. Further, a roof head lining fixing bolt 90 provided at an outer end portion 89A of a roof head lining (molded ceiling) 89, which is formed of a softer material than a material of the pillar garnish 32, is located at an upper rear portion of the extended portion 84A of the guide portion 84.

Next, a description will be given of the operation of this embodiment.

In the head-protecting air bag apparatus 10 in accordance with this embodiment, during the early period of the expansion of the air bag, the gas (arrow W in FIG. 1) supplied from the inflator 14 passes through the guide portion 84 and is introduced into the air bag 16, and the inflatable portions 80 and 82 are inflated, thereby producing high tension at the tension line T connecting the front and rear fixing points. Since the end of the guide portion 84 which is connected to the inflator 14, namely, the extended portion 84A, is extended to the first noninflatable portion 74 by connecting with the second noninflatable portion 75, which is located in the roof side region adjacent to the pillar guide portion 84, a portion W1, at which gas flow downstream of the guide portion 84 changes drastically, is located to the rear of the pillar-garnish fixing bolt 60 provided at the upper fastened portion of the pillar garnish 32, as shown in FIG. 2. Consequently, a load applied to the upper fastened portion of the pillar garnish 32 can be reduced.

In addition, since the changing portion W1, at which the gas flow downstream of the guide portion 84 changes drastically, is located in a vicinity of a fastened portion (the portion at which the roof head lining fixing bolt 90 is provided) of the roof head lining 89, which exhibits less deformation resistance than the pillar garnish 32, it is also possible to prevent breakage of the fastened portion of the roof head lining 89.

Further, in the head-protecting air bag apparatus 10 in accordance with this embodiment, during the early period of the expansion of the air bag, the gas supplied from the inflator 14 passes through the extended portion 84A of the guide portion 84 which is substantially parallel to the roof side rail section 28 and extends to the first noninflatable portion 74 (which is inclined in such a manner as to be oriented toward the guide portion 84), before reaching the first noninflatable portion 76. Hence, the gas flows more smoothly, and the load applied to the upper fastened portion of the pillar garnish 32 can be reduced further. Further, since a load acting upon the first noninflatable portion 74 due to gas pressure can be reduced, and since gas pressure when the gas hits the first noninflatable portion 76 is sufficiently lowered, it is possible to further improve an effect of reducing breakage of the air bag 16.

Although a detailed description has been given above of a specific embodiment of the present invention, the present invention is not limited to such an embodiment, and it is apparent to those skilled in the art that various changes and modifications may be made without departing from the spirit and scope of the invention. For example, although in this embodiment the end (rear end) of the guide portion 84 of the air bag 16, namely, the extended portion 84A, is extended to the first noninflatable portion 74 located in a roof side region 88, the end (rear end) of the guide portion 84 may be extended not only to the first noninflatable portion 74 but also to the first noninflatable portion 76 and 78. In the case where the guide portion 84 is extended downstream of the center pillar section (B pillar section) 18, it is possible to reduce the load applied to the upper fastened portion of the center pillar garnish due to gas pressure.

Furthermore, although in this embodiment the inflator 14 is provided at the front pillar section 20, and the air bag 16 is provided in such a manner as to extend from the front pillar section 20 along the roof side rail section 28, the present invention is also applicable to a head-protecting air bag apparatus in which the inflator 14 is provided at a quarter pillar section 30, and in which the air bag 16 is provided in such a manner as to extend from the quarter pillar section 30 along the roof side rail section 28.

What is claimed is:

1. A head-protecting air bag apparatus comprising:
   an air bag; and
   an inflator which supplies gas to said air bag,
   wherein said air bag comprises:
      a main body, attachable to a roof side rail of a vehicle body, having a peripheral edge, said main body including a plurality of first non-inflatable portions and a plurality of first inflatable portions disposed substantially parallel to each other, and
      a guide portion connected to said peripheral edge and integrally formed with said main body so as to allow gas supplied by said inflator to be introduced into said main body, said guide portion including an extended portion defined by a second non-inflatable portion disposed between said peripheral edge of said main body and an end of one of said plurality of first non-inflatable portions,
      wherein a second inflatable portion is defined by one of said first non-inflatable portions and said second non-inflatable portion, and is connected to said first inflatable portion via a bottom of the first non-inflatable portion.

2. The head-protecting air bag apparatus according to claim 1, wherein said extended portion extends substantially parallel to the roof side rail, and said one of said plurality of first non-inflatable portions is inclined toward said extended portion.

3. The head-protecting air bag apparatus according to claim 2, wherein said head-protecting air bag is covered by a pillar garnish and by a cover made of a material which is softer than the pillar garnish.

4. The head-protecting air bag apparatus according to claim 3, wherein said cover is a roof head lining.

5. The head-protecting air bag apparatus according to claim 2, wherein each of the other plurality of first non-inflatable portions is formed in a bow shape in which a central portion bulges toward said guide portion.

6. The head-protecting air bag apparatus according to claim 1, wherein said head-protecting air bag is covered by a pillar garnish and by a cover made of a material which is softer than the pillar garnish.

7. The head-protecting air bag apparatus according to claim 6, wherein said cover is a roof head lining.

8. The head-protecting air bag apparatus according to claim 7, wherein said second inflatable portion intersects a tension line connecting a front end and a rear end of said air bag.

9. The head-protecting air bag apparatus according to claim 8, wherein an end portion of said extended portion continuous with said one of said plurality of first non-inflatable portions is disposed in a vicinity of a fixing portion at which the roof head lining is fixed to the vehicle body.

10. The head-protecting air bag apparatus according to claim 9, wherein each of the other plurality of first non-inflatable portions is formed in a bow shape in which a central portion bulges toward said guide portion.

11. The head-protecting air bag apparatus according to claim 8, wherein a shape of said air bag, when expanded, is substantially of a parallelogram.

12. The head-protecting air bag apparatus according to claim 11, wherein said extended portion extends substantially parallel to the roof side rail, and said one of said plurality of first non-inflatable portions is inclined toward said extended portion.

13. The head-protecting air bag apparatus according to claim 7, wherein an end portion of said extended portion continuous with said one of said plurality of first non-inflatable portions is disposed in a vicinity of a fixing portion at which the roof head lining is fixed to the vehicle body.

14. The head-protecting air bag apparatus according to claim 1, wherein a shape of said air bag, when expanded, is substantially of a parallelogram.

15. The head-protecting air bag apparatus according to claim 1, wherein said second inflatable portion intersects a tension line connecting a front end and a rear end of said air bag.

16. The head-protecting air bag apparatus according to claim 1, wherein said first inflatable portions are formed at both front and rear sides of said plurality of first non-inflated portions.

17. The head-protecting air bag apparatus according to claim 1, wherein said guide portion is provided at a pillar.

18. The head-protecting air bag apparatus according to claim 1, wherein said plurality of first non-inflatable portions intersect a tension line of said air bag when said air bag is expanded, and extend in a substantially vertical direction.

19. The head-protecting air bag apparatus according to claim 18, wherein each of the plurality of first non-inflatable portions which is not connected to said second non-inflatable portion is provided at an intermediate portion in a vertical direction of said main body and the gas supplied from said inflator passes through said guide portion and flows smoothly in separate upward and downward directions along said plurality of first non-inflated portions.

* * * * *